Sept. 1, 1959 W. ZARNACK 2,902,004
FLUID PRESSURE OPERATED ACTUATING DEVICE
Filed April 2, 1956 2 Sheets-Sheet 1

Inventor:
Werner Zarnack

Sept. 1, 1959  W. ZARNACK  2,902,004
FLUID PRESSURE OPERATED ACTUATING DEVICE
Filed April 2, 1956  2 Sheets-Sheet 2
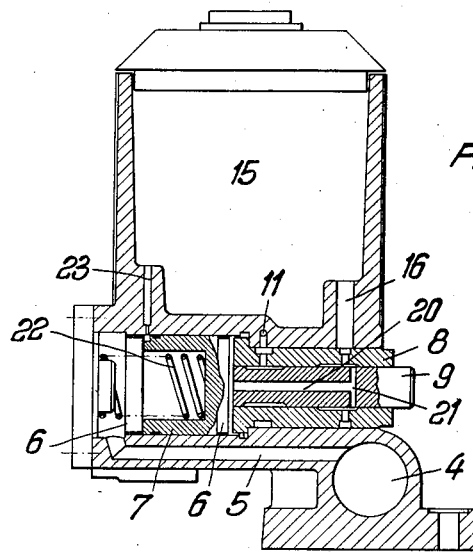
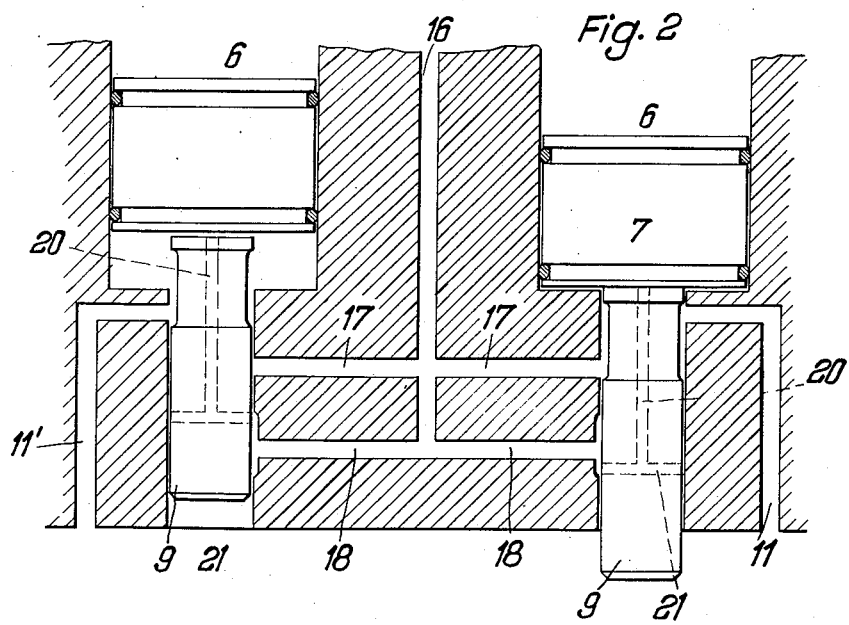
Inventor:
Werner Zarnack

United States Patent Office 2,902,004
Patented Sept. 1, 1959

2,902,004
FLUID PRESSURE OPERATED ACTUATING DEVICE

Werner Zarnack, Bredenbeck am Deister, Germany

Application April 2, 1956, Serial No. 575,437

Claims priority, application Germany April 2, 1955

2 Claims. (Cl. 121—38)

The present invention relates to a hydraulically operated steering clutch mechanism for crawler tractors.

To operate steering clutches and brakes in crawler tractors it is known to use hydraulic auxiliary devices to reduce the necessary actuating force to be applied on the hand lever which might be considerable due to the high contact pressure of the steering clutches. The design of these hydraulic auxiliary devices is difficult because it is necessary to operate both steering clutches separately, together, and one after the other. It is not possible to use a hydraulic system in which the booster devices are in parallel in a single oil circuit. It is possible to improve the operating conditions, however, by arranging check valves in the pressure pipes leading to the booster units. These check valves, however, eliminate only some of the difficulties which exist because it is not possible to adjust the resistance of both steering clutches to exactly the same values. The hydraulic system must overcome this resistance. Due to the wear caused during operation and inevitable sticking and adhering of the clutch disks, the clutch forces might differ during operation of the machine up to 30% which results in incorrect operation of the steering clutch booster devices arranged in parallel, when actuated together or separately, since the hydraulic oil tends to follow the way of the least resistance. Thus, sufficient oil pressure cannot build up to actuate the one steering clutch which requires the higher pressure. A blocking of the operating levers and undue oscillations in the oil circuit of the system result, causing hydraulic impacts and possibly destruction of the hydraulic pipes and leakage in the joints.

It is, therefore, one object of the present invention to eliminate the known deficiencies by arranging the hydraulic working cylinders for each steering clutch booster device in a separate hydraulic circuit. Alternatively, a separate hydraulic pump may be provided to feed each circuit, or both circuits may be supplied from twin pumps which according to the present invention are provided with a suction circuit common to both steering clutch booster devices and connected to a pressure medium tank. On the pressure side, the pump feeds the hydraulic cylinders associated with both steering clutch booster devices through separate circuits.

It is another object of the present invention to provide a hydraulically operated steering clutch mechanism for crawler tractors, wherein a simple pipe system is obtained, and which includes means for deriving the power from the engine at one point only. It is, however, difficult to bring about the desired results because the drive for the hydraulic pump must be taken directly from the engine and not from a shaft of the gear box, in order to permit continuous operation of the unit, even after disengagement of the engine clutch.

The steering levers for both tracks of the crawler tractor must be arranged side by side.

It is, therefore, still another object of the present invention to provide a parallel arrangement of the working cylinders, which enables a very simple design of the actuating linkage for both of the steering clutches.

For the safe operation of the steering clutches, a continuous and automatic bleeding of the oil circuit is of great importance. Air may enter the system not only through leaks on the suction side, when the oil pressure falls below atmospheric pressure due to suction resistance during operation, but air may also enter the system when the oil volume is varied due to changes in the temperature of the hydraulic oil during standstill of the machine.

It is, therefore, yet another object of the present invention to provide a vent hole at the highest point of the hydraulic system for automatic bleeding thereof. When the working piston is stationary after actuation of the steering clutch, the piston edge opens the vent hole so that the air may enter the suction side of the hydraulic system. The arrangement of the oil reservoir immediately above the working cylinder is of particular advantage, and a very simple design is accomplished when the oil reservoir is cast integral with the two parallel working cylinders. Furthermore, oil return from the hydraulic cylinder to the oil reservoir may be directly from the control piston. The integral arrangement of the oil reservoir with the working cylinder reduces the number of oil pipes to a minimum and thus increases considerably the operating safety of the system. On the other hand, the described bleeder arrangement prevents the forming of air pockets at any point of the system, which also cause oscillations in the oil circuit.

It is still a further object of the present invention to provide a hydraulically operated steering clutch mechanism, wherein suitable valve slides are arranged. It is a deficiency of known constructions that the valves open at once upon axial movement of the control valve and allow the oil to flow to the working cylinder, a drawback eliminated by the present invention.

It is much simpler and safer to recess the valve slide so that only after overriding the bleeder hole the oil can flow into the chamber in front of the working cylinder piston.

With these and other objects in view which will become apparent in the following detailed description, the present invention will be clearly understood in connection with the accompanying drawings, in which:

Figure 2 is a fragmentary sectional view of the circuit more clearly indicating both valve slides; and Figure 3 is a sectional view through the pressure medium tank.

Figure 1:
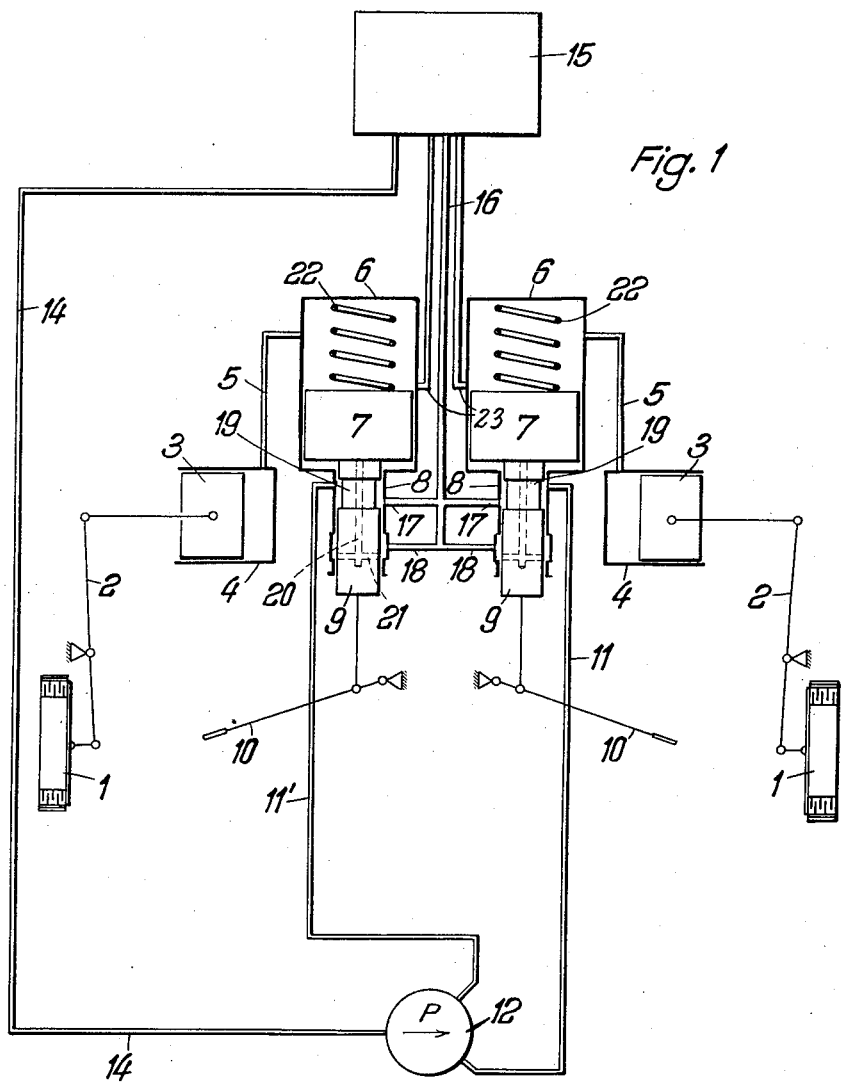
Figure 1 is a diagrammatic illustration of the oil circuit associated with the two steering clutch booster devices.

Referring now to the drawings, steering clutches 1 are provided for the tracks. Links 2 actuate the steering clutches independently from each other through means of the pistons 3. The pistons 3 are operable in cylinders 4 which are connected with a working cylinder 6 each, through means of conduits 5. Each working cylinder 6 accommodates a working piston 7.

A guide sleeve 8 for a valve slide 9 is provided adjacent the working cylinders. Each of the valve slides 9 is actuated by a lever 10.

Each guide sleeve 8 has a pressure line 11 and 11', respectively. Both lines end in the twin pumps 12 which are driven through a shaft 13 from a power source (not shown). The suction side of the pump 12 is connected to the pressure medium tank 15 through means of the suction conduit 14.

The common pressure medium tank 15 is also in communication with the sleeves 8 for the valve slides 9 through means of the conduit 16 and the branch lines 17 and 18, respectively.

Each of the valve slides 9 has a recessed portion 19 and an axial bore 20 which extends from one end of the valve slide to a crosswise disposed bore 21.

The working pistons 7 move freely in the cylinders 6 and are forced to their initial positions by compressions springs 22. The springs 22 assist the action of the oil returning from the pressure cylinder 4 and the conduit 5.

Figs. 1 and 2 illustrate diagrammatically the complete unit. Fig. 3 shows an embodiment of the device in which the pressure cylinders 4 and the parallel working cyinders are cast integral with the pressure medium tank 15. The working cylinders 6, together with the conduits 5 and the crosswise arranged pressure cylinders 4 form a hydraulic angular drive, wherein the axis of the working cylinders 6 forms a right angle to the axis of the cylinders 4.

The operation of the present device is performed in the following manner:

The twin pumps 12 work continuously and suck oil from the tank 15 through a conduit 14. The oil is supplied through separate conduits 11 and 11' to the independent sleeves 8 which accommodate the valve slides 9. In neutral position, as shown in Fig. 1, the pressure oil flows through the sleeve 8 and conduits 17 and 16 to the oil tank 15.

If now, for instance, the left hand steering clutch is to be actuated, the associated valve slide 9 (Figs. 1 and 2, left hand side) is moved forward by means of the lever 10, which action opens a passage into the cylinder 6 through means of the recessed portion 19. The pressure oil supplied from the pump 12 through the pressure line 11' now enters the chamber below the piston 7 in the working cylinder 6. The spring 22 is tensioned and the oil in front of the piston 7 in the working cylinder 6 is forced through the conduit 5 into the pressure cylinder 4. The pressure piston 3 thus actuates the left hand steering clutch 1 through means of the linkage 2. This is accomplished with increased force as compared to the force applied on the actuating lever 10.

As long as the working piston 7 is in its lower end position, the chamber above the piston 7 in the cylinder 6 is in communication with the tank 15 through means of the bleeder line 23. When the clutch disks are worn, the tank allows for the pressure piston 3 to retreat further to force the excess oil in the cylinder 4 through the lines 5, the working cylinder 6 and the bleeder device 23 back to the tank 15.

Thus, any play in the clutch, caused by abrasion, is automatically compensated. The clutch will not slip. It is important that at the beginning of the movement of the actuating lever 10 the valve slide 9 bears against the working piston 7 to displace the piston 7 to an extent so as to close the bleeder line 23 and to have the control edge on the valve slide 9 cover the return line 17. Together with the freely movable piston 7 the valve slide 9 effects a follow-up control to allow for a very sensitive operation of the steering clutches. This is due to the fact that at the beginning of the movement of the actuating lever 10 the working piston 7 at first rests on the valve slide 9. Since oil is continuously supplied from the pump through the pressure line 11' to the working cylinder 6, the piston 7 must move on, while the valve slide 9 remains in its position. The piston 7 is lifted off the valve slide 9 and thus opens a more or less wide passage for the feed oil. The oil can escape between the valve slide 9 and the working piston 7 into the bore 20 inside the valve slide 9 and then through the crosswise disposed bore 21 and the return lines 18 and 16, respectively, to the oil tank 15. In accordance with the movement of the actuating lever 10 to move the valve slide 9 more or less, the passage between the piston 7 and the valve slide 9 is varied, during which action the pressure above the piston 7 always tends to return the piston 7 as soon as the pressure in the chamber below the piston 7 in the cylinder 6 decreases.

It is to be understood that both actuating levers 10 can be operated independently from each other, or at the same time, or one after the other, or in opposite directions. Since each control valve and each steering clutch booster device, respectively, is arranged in a circuit completely separate from the circuit of the other, the different elements cannot interfere with each other.

The arrangement illustrated has the great advantage that it can also be effectively operated when the drive is faulty, in so far as the working pistons 7 can be mechanically moved through means of the actuating levers 10 and the valve slides 9 in case of the pump 12 being inoperative or unserviceable, although greater effort is required for this operation. Even then it is possible to actuate the pistons 3 controlling the steering clutches 1, through means of the hydraulic drive mechanism 6, 5, 4.

While I have disclosed one embodiment of the present invention, it is to be understood that this embodiment is given by example only and not in a limiting sense, the scope of the present invention being determined by the objects and the claims.

I claim:

1. A motor and follow-up control for use in connection with a dual pulsator system comprising a guide-sleeve, a working cylinder communicating with said guide-sleeve, a spring biased working piston reciprocating in said working cylinder, a valve slide reciprocating in said guide-sleeve and engaging said working piston in the inoperative position of said motor, said valve slide having a recessed portion intermediate its ends form a chamber between said guide-sleeve and said valve slide, a source of hydraulic pressure communicating with said chamber, a pressure tank communicating with said chamber and a return conduit from said tank to said source of hydraulic pressure, said valve slide having a crosswise disposed bore and an axial bore leading from the end of said valve slide adjacent said working cylinder to said crosswise disposed bore, a communication line leading from said guide-sleeve within a working range of said slide valve to said tank, thus connecting said working cylinder through said axial and crosswise disposed bores and said communication line with said tank, means positioning said valve slide in said guide sleeve to interconnect said source of hydraulic pressure through said chamber to the working side of said working cylinder and thus feed hydraulic pressure into said working cylinder through said chamber, whereupon said working piston is disengaged from said slide valve and moved in said cylinder against the force of said spring.

2. The motor and follow-up control, as set forth in claim 1, wherein said working cylinder and said tank are formed integrally as a single unit.

References Cited in the file of this patent

UNITED STATES PATENTS

| | | |
|---|---|---|
| 2,052,182 | Le Bleu | Aug. 25, 1936 |
| 2,103,530 | Henry | Dec. 28, 1937 |
| 2,360,578 | Porter | Oct. 17, 1944 |
| 2,451,334 | Groves | Oct. 12, 1948 |
| 2,491,551 | Cross | Dec. 20, 1949 |
| 2,499,845 | Butler | Mar. 7, 1950 |